(12) United States Patent
Peng et al.

(10) Patent No.: US 9,341,872 B2
(45) Date of Patent: *May 17, 2016

(54) LIQUID CRYSTAL DISPLAY DEVICE WITH CONTROLLABLE VIEWING ANGLE AND DRIVING METHOD THEREOF

(71) Applicant: SHANGHAI TIANMA MICRO-ELECTRONICS CO., LTD., Shanghai (CN)

(72) Inventors: Xuhui Peng, Shanghai (CN); Zhihua Ling, Shanghai (CN); Sitao Huo, Shanghai (CN); Xinghua Nie, Shanghai (CN)

(73) Assignee: Shanghai Tianma Micro-Electronics Co., Ltd., Shanghai (CN)

( * ) Notice: Subject to any disclaimer, the term of this patent is extended or adjusted under 35 U.S.C. 154(b) by 277 days.

This patent is subject to a terminal disclaimer.

(21) Appl. No.: 13/909,553

(22) Filed: Jun. 4, 2013

(65) Prior Publication Data

US 2014/0152928 A1 Jun. 5, 2014

Related U.S. Application Data

(63) Continuation-in-part of application No. 12/866,197, filed as application No. PCT/CN2009/070566 on Feb. 27, 2009, now Pat. No. 8,482,501.

(30) Foreign Application Priority Data

Mar. 4, 2008 (CN) .......................... 2008 1 0034193

(51) Int. Cl.
G02F 1/1343 (2006.01)
G02F 1/133 (2006.01)
(Continued)

(52) U.S. Cl.
CPC .......... *G02F 1/13306* (2013.01); *G02F 1/1323* (2013.01); *G02F 2001/13712* (2013.01); *G02F 2001/134381* (2013.01)

(58) Field of Classification Search
None
See application file for complete search history.

(56) References Cited

U.S. PATENT DOCUMENTS 7,298,445 B1 11/2007 Choi et al.
7,599,035 B2 10/2009 Park et al.
(Continued)

FOREIGN PATENT DOCUMENTS

CN 1688920 A 10/2005
CN 1975518 A 6/2007
(Continued)

OTHER PUBLICATIONS

Z. L. Xie et al. Permanent grayscales in bistable twisted nematic liquid-crystal displays. American Institute of Physics. Applied Physics Letters. vol. 81, No. 14. Sep. 30, 2002.
(Continued)

*Primary Examiner* — Richard Kim
(74) *Attorney, Agent, or Firm* — Alston & Bird LLP (57) ABSTRACT

A liquid crystal display device with controllable viewing angle of the present invention has an upper substrate on which an upper substrate common electrode is disposed, a lower substrate on which a pixel electrode is disposed, and a liquid crystal layer sandwiched between the upper and the lower substrates. The liquid crystal molecules are vertical to the upper substrate when no voltage is applied, and a plurality of strip-like lower substrate common electrodes are disposed on the lower substrate and arranged in parallel substantially. The upper substrate common electrode and the pixel electrode provide an electric field perpendicular to the upper substrate, to form a first viewing angle mode when a voltage is applied, the lower substrate common electrode and the pixel electrode provide an electric field perpendicular to the upper substrate to form a second viewing angle mode when a voltage is applied.

12 Claims, 5 Drawing Sheets

(51) Int. Cl.
*G02F 1/13* (2006.01)
*G02F 1/137* (2006.01)

(56) References Cited

U.S. PATENT DOCUMENTS

| | | |
|---|---|---|
| 7,728,801 B2 | 6/2010 | Tsai et al. |
| 7,995,181 B2 | 8/2011 | Choi et al. |
| 8,208,102 B2 | 6/2012 | Nishida |
| 8,284,365 B2 | 10/2012 | Park et al. |
| 8,482,501 B2 * | 7/2013 | Peng et al. .................. 345/87 |
| 8,482,711 B2 | 7/2013 | Nishida |
| 2005/0157231 A1 | 7/2005 | Yang et al. |
| 2005/0219446 A1 | 10/2005 | Hisatake |
| 2005/0286000 A1 | 12/2005 | Tsai et al. |
| 2006/0146250 A1 | 7/2006 | Wu et al. |
| 2007/0024789 A1 | 2/2007 | Itou et al. |
| 2007/0121047 A1 | 5/2007 | Chung et al. |
| 2007/0146606 A1 | 6/2007 | Yamashita |
| 2007/0153196 A1 | 7/2007 | Jang et al. |
| 2007/0176872 A1 | 8/2007 | Kazuyoshi et al. |
| 2008/0068523 A1 | 3/2008 | Mitsui et al. |

FOREIGN PATENT DOCUMENTS

| | | |
|---|---|---|
| CN | 1991461 A | 7/2007 |
| CN | 1991466 A | 7/2007 |
| CN | 1991535 A | 7/2007 |
| CN | 101149540 A | 3/2008 |
| JP | 2005292586 A | 10/2005 |
| JP | 2005292709 A | 10/2005 |
| JP | 2006011451 A | 1/2006 |
| JP | 2007034151 A | 2/2007 |
| KR | 20000060543 A | 10/2000 |
| WO | WO-2004019117 A2 | 3/2004 |
| WO | WO-2008010333 A1 | 1/2008 |

OTHER PUBLICATIONS

Extended European Search Report regarding Application No. 09716829.8-1228 / 2256542, dated Jul. 26, 2012.
Third Korean Office Action regarding Application No. 10-2010-7018211, dated Mar. 29, 2013. Translation provided by Unitalen Attorneys at Law.
International Search Report regarding Application No. PCT/CN2009/070566, mailed Jun. 4, 2009.
International Search Report regarding Application No. PCT/CN2009/070541, mailed Jun. 4, 2009.

* cited by examiner

LIQUID CRYSTAL DISPLAY DEVICE WITH CONTROLLABLE VIEWING ANGLE AND DRIVING METHOD THEREOF

This application is a continuation-in-part of U.S. patent application Ser. No. 12/866,197, filed on Aug. 5, 2010, which is a Section 371 National Stage Application of International Application No. PCT/CN2009/070566, filed Feb. 27, 2009, which claims the priority of Chinese Patent Application No. 200810034193.7, filed with the Chinese Intellectual Property Office on Mar. 4, 2008, entitled "Liquid Crystal Display Device with Controllable Viewing Angle and Driving Method thereof", both of which are incorporated herein by reference in their entirety.

FIELD OF INVENTION

The present invention generally relates to a liquid crystal display device and a driving method thereof, and more particularly to a liquid crystal display which is capable of switching viewing angle and a driving method thereof.

BACKGROUND OF THE INVENTION

In recent years, liquid crystal display device is widely used to display information on the electronic products due to it is light and thin, and lower power consumption.

Liquid crystal display devices may be classified into two kinds as wide viewing angle and narrow viewing angle according to the range of viewing angle. Generally, there is a constraint on the viewing angle for the conventional Twisted Nematic (TN) liquid crystal display, i.e., the displayed contents may be seen clearly only at a specific viewing angle. To alleviate the constraint on the viewing angle of the liquid crystal display, and to make the user see the displayed contents clearly at any angle, there have proposed various technologies about wide viewing angle in the prior art, such as attaching viewing angle compensation film to the Liquid Crystal Display, Multi-domain Vertical Alignment Liquid Crystal Display, In-Plane-Switching Liquid Crystal Display. Although widening viewing angle technologies become the trend in the art, in some applications of liquid crystal displays, it is expected to constrain the viewing angle, such that user may see the images on the liquid crystal displays just at a specific angle to protect privacy.

In the prior art, a liquid crystal display with controllable viewing angle has been discussed. In Chinese Patent Application Publication CN1991466A, a modulation electrode is added to the In-Plane-Switching Liquid Crystal Display (in IPS display mode or FFS display mode) to achieve a conversion from wide viewing angle to narrow viewing angle. The viewing angle conversion liquid crystal display performs the conversion between a wide viewing angle and a narrow viewing angle, and therefore the wide viewing angle or the narrow viewing angle may be obtained respectively on the same liquid crystal display according to different requirements.

The prior art described above are all regard to the switch between the wide viewing angle and the narrow viewing angle. Although the technology for switching between the wide viewing angle and the narrow viewing angle may meet the requirements on safety and privacy, it may not meet the requirement on the diversification of viewing angle directions.

SUMMARY OF THE INVENTION

An object of the present invention is to provide a liquid crystal display device with controllable viewing angle which may obtain various viewing angle directions easily depending on different requirements.

An other object of the present invention is to provide a driving method for a liquid crystal display device with controllable viewing angle, the viewing angle of the liquid crystal display device may be adjusted simply depending on different requirements by the method.

In order to solve above problems, the liquid crystal display device with controllable viewing angle according to the present invention includes a upper substrate on which an upper substrate common electrode is disposed, a lower substrate parallel to the upper substrate, on which a pixel electrode is disposed, and a liquid crystal layer sandwiched between the upper substrate and the lower substrate, the liquid crystal molecules are perpendicular to the upper substrate in substance when no voltage is applied, and a plurality of strip-like lower substrate common electrodes disposed on the lower substrate and arranged in parallel substantially, wherein the upper substrate common electrode and the pixel electrode provide an electric field perpendicular to the upper substrate in order to form a first viewing angle mode when a voltage is applied to the upper substrate common electrode and the pixel electrode. The lower substrate common electrode and the pixel electrode provide an electric field perpendicular to the upper substrate and an electric field parallel to the upper substrate in order to form a second viewing angle mode when a voltage is applied to the lower substrate common electrode and the pixel electrode.

A driving method for the liquid crystal display device with controllable viewing angle is provided according to the invention, which includes following steps: applying a voltage to the upper substrate common electrode and the pixel electrode to generate an electric field perpendicular to the upper substrate and thus provide a first viewing angle mode; applying a voltage to the lower substrate common electrode and the pixel electrode to generate an electric field perpendicular to the upper substrate and an electric field parallel to the upper substrate and thus provide a second viewing angle mode; and switching the first viewing angle mode and the second viewing angle mode by selectively applying the voltage to the upper substrate common electrode or the lower substrate common electrode.

DESCRIPTION OF THE PREFERRED EMBODIMENTS

The embodiments of the present invention will be described in detail with reference to the accompanying drawings.

Figure 1:
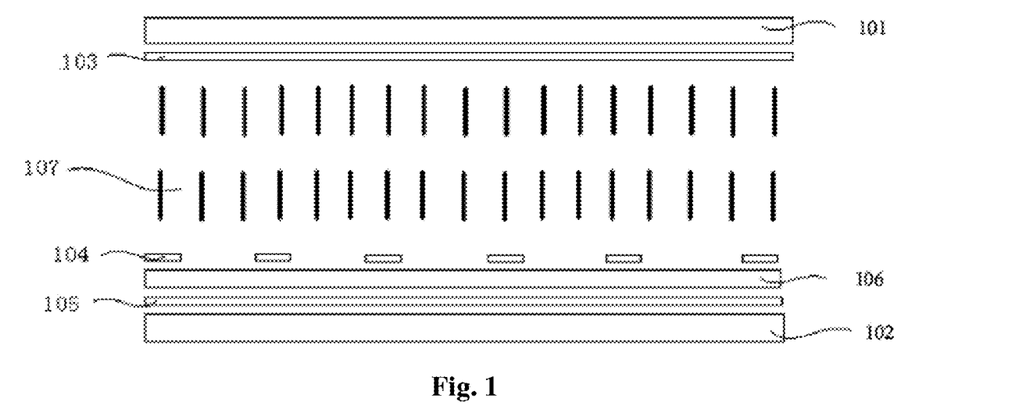
FIG. 1 is a sectional diagram of a liquid crystal display device with controllable viewing angle according to the present invention.

FIG. 1 is a sectional diagram of a liquid crystal display device with controllable viewing angle according to the present invention. As shown in FIG. 1, the liquid crystal display device with controllable viewing angle according to the present invention includes a lower glass substrate 102 and an upper glass substrate 101. A pixel electrode 105 is formed on the upper surface of the lower glass substrate 102, an insulation layer 106 is deposited on the pixel electrode 105, and a lower substrate common electrode 104 is formed on the insulation layer 106; an upper substrate common electrode 103 is formed on the upper glass substrate 101; and a liquid crystal layer 107 is filled between the upper substrate common electrode 103 and the lower substrate common electrode 104, the liquid crystal molecules in the liquid crystal layer 107 have negative dielectric anisotropy. In the initial state, no voltage applied, the liquid crystal molecules in the liquid crystal layer 107 are arranged perpendicular to the upper glass substrate 101 and the lower glass substrate 102. In a preferred embodiment of the present invention, the lower substrate common electrode 104, the upper substrate common electrode 103 and the pixel electrode 105 are all transparent electrodes, for example transparent conductive layers formed by tin indium oxide (ITO), indium zinc oxide (IZO), or indium gallium oxide (IGO). The insulation layer 106 may be a transparent protecting layer, such as silicon oxide or organic material layer. As the liquid crystal display device with controllable viewing angle according to the present invention adopts a display mode similar to the In-Plane-Switching, the lower substrate common electrode 104 is preferred configured to be only formed portions above of the pixel electrode 105. For example, the lower substrate common electrode 104 is formed to be lines of protuberances which are arranged in the same direction and there is a certain interval between adjacent lines to expose portions of the surface of the pixel electrode 105.

Figure 2:
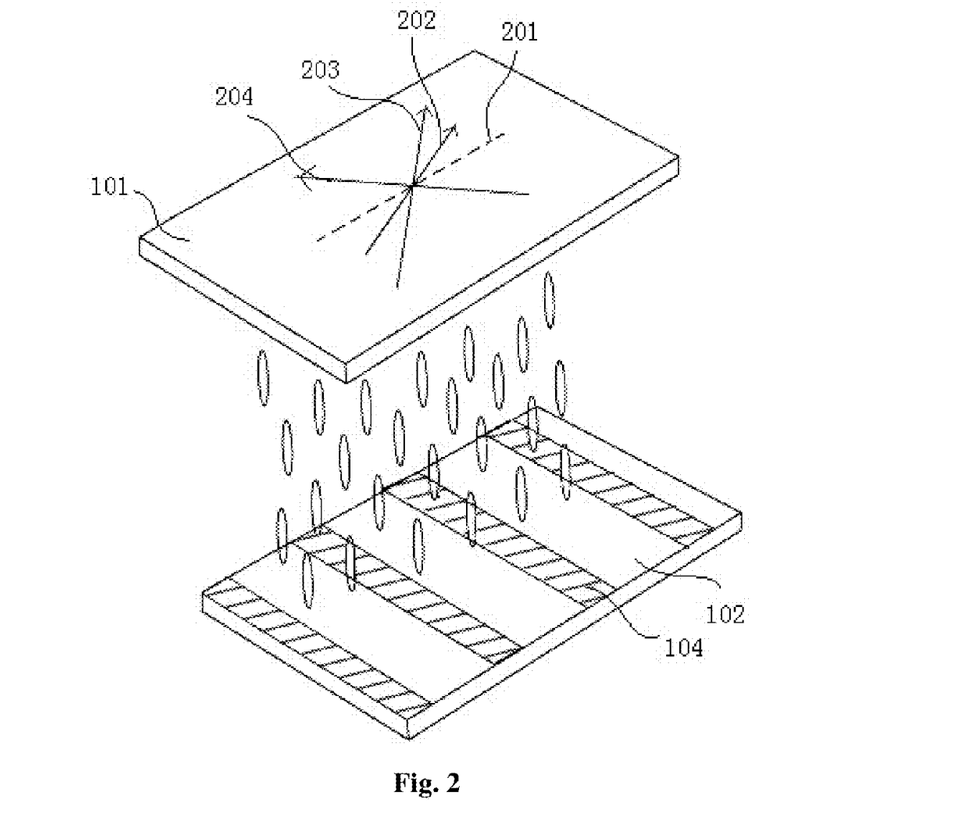
FIG. 2 is a diagram of the polarization direction and the liquid crystal orientation direction in the initial state of the liquid crystal display device with controllable viewing angle according to the present invention.

FIG. 2 is a diagram of the polarization direction of polars and orientation direction of liquid crystal molecules of the liquid crystal display device with controllable viewing angle according to the present invention. As shown in FIG. 2, in a preferred embodiment of the present invention, the orientation of the liquid crystal molecules is perpendicular to the upper substrate. The liquid crystal molecules are made to have a pretilt angle of 88 degree by friction process, wherein the tilting direction is indicated by 202, and the angle between 202 and the direction 201 of the short side of the pixel is 5 degree. The absorption axis direction of the polarization plate of the upper substrate is indicated by 203, and the angle between 203 and the direction 201 of the short side of the pixel is 45 degree; the absorption axis direction of the polarization plate of the lower substrate is indicated by 204, and the angle between 204 and the direction 201 of the short side of the pixel is 135 degree, thus the absorption axes of the polarization plates of the upper substrate and the lower substrate are orthogonal.

Figure 3:
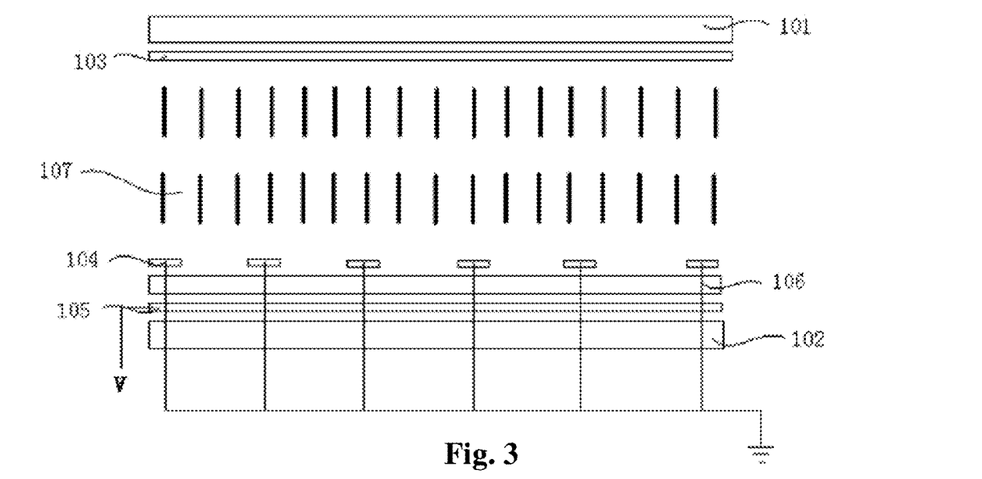
FIG. 3 is a diagram of the state of the electrode when the liquid crystal display device with controllable viewing angle according to the present invention is in 6 o'clock viewing angle direction.

FIG. 3 is a diagram of the state of the electrode when the liquid crystal display device with controllable viewing angle according to the present invention is in the second viewing angle mode (6 o'clock viewing angle direction). As shown in FIG. 3, the liquid crystal display device with controllable viewing angle according to the present invention is operated in the 6 o'clock viewing angle direction mode (lower viewing angle mode), thus the liquid crystal display device with controllable viewing angle may obtain a high contrast only in the 6 o'clock direction, and a remarkable optical performance difference, such as serious gray scale inversion, is generated in other viewing angles, such that the image can not be seen clearly. To provide the 6 o'clock viewing angle direction, when the liquid crystal display device with controllable viewing angle according to the present invention is operating in the 6 o'clock viewing angle direction mode, a perpendicular electrical field and a horizontal electrical field are generated in the liquid crystal layer 107 by the pixel electrode 105 and the lower substrate common electrode 104, for example, by applying a driving voltage V to the pixel electrode 105, connecting the lower substrate common electrode 104 to the ground, and floating the upper substrate common electrode 103, to control the redirection of the liquid crystal such that the liquid molecules in the liquid crystal layer 107 deflect towards the direction perpendicular to the perpendicular electrical field and the horizontal electrical field (the liquid crystal molecules in the liquid crystal layer 107 have negative dielectric anisotropy), and parallel to the upper glass substrate 101 and the lower glass substrate 102.

As showed in FIG. 3, when there is no voltage applied, the liquid crystal molecules are arranged perpendicular to the upper glasses substrate 101 and the lower glass substrates 102, the polarization plates are attached to the upper glass substrate 101 and the lower glass substrate 102 with the absorb axes of the polarization plates vertical to each other, the liquid crystal display is in a dark state. When there is a voltage applied between the pixel electrode 105 and the lower substrate common electrode 104, the liquid molecules in the liquid crystal layer 107 deflect towards the direction perpendicular to the perpendicular electrical field and the horizontal electrical field, that is, towards the strip direction of the lower substrate common electrode, thus an angle between the falling direction and the absorption axes of the upper and lower polarization plates is 45 degree, the liquid crystal display is in a light state.

Figure 4:
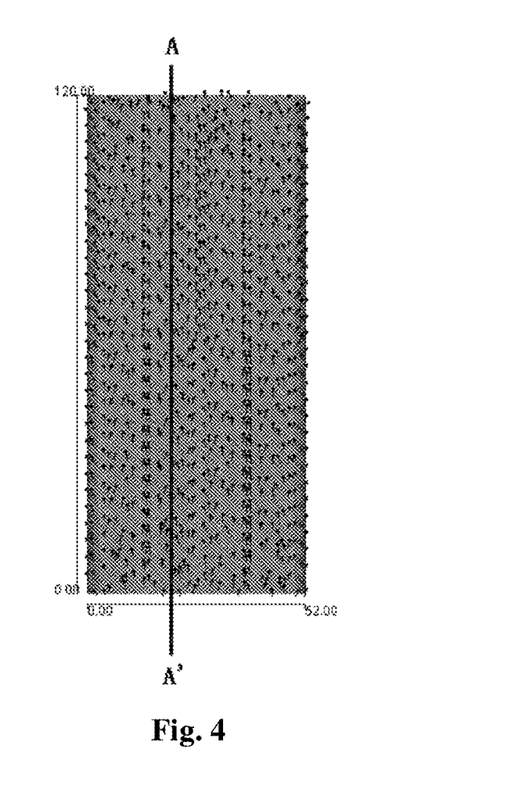
FIG. 4 is a top diagram of the arrangement of liquid crystal molecules in the case of the application of a voltage when the liquid crystal display device with controllable viewing angle according to the present invention is in 6 o'clock viewing angle direction.
Figure 5:
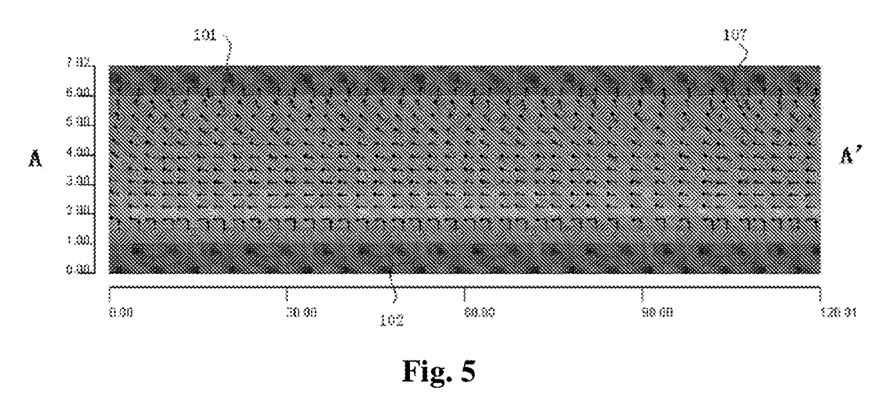
FIG. 5 is a sectional view of the top diagram of the arrangement of liquid crystal molecules in the case of the application of a voltage when the liquid crystal display device with controllable viewing angle according to the present invention is in 6 o'clock viewing angle direction.
Figure 6:
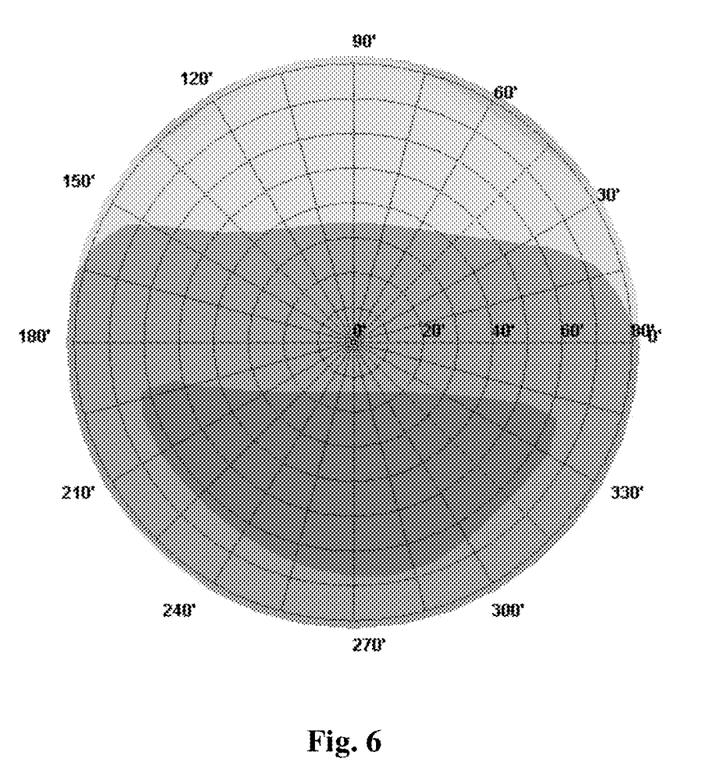
FIG. 6 is a viewing angle characteristic simulation diagram when the liquid crystal display device with controllable viewing angle according to the present invention is in 6 o'clock viewing angle direction.

Reference to FIGS. 4 and 5, FIG. 4 shows the arrangement direction distribution diagram of the liquid crystal molecules in the case of the application of a voltage when the liquid crystal display device with controllable viewing angle is in 6 o'clock viewing angle direction and FIG. 5 shows a sectional diagram taken along line AA' in the FIG. 4. FIG. 6 shows a viewing angle characteristic simulation diagram in the 6 o'clock viewing angle direction mode.

Figure 7:
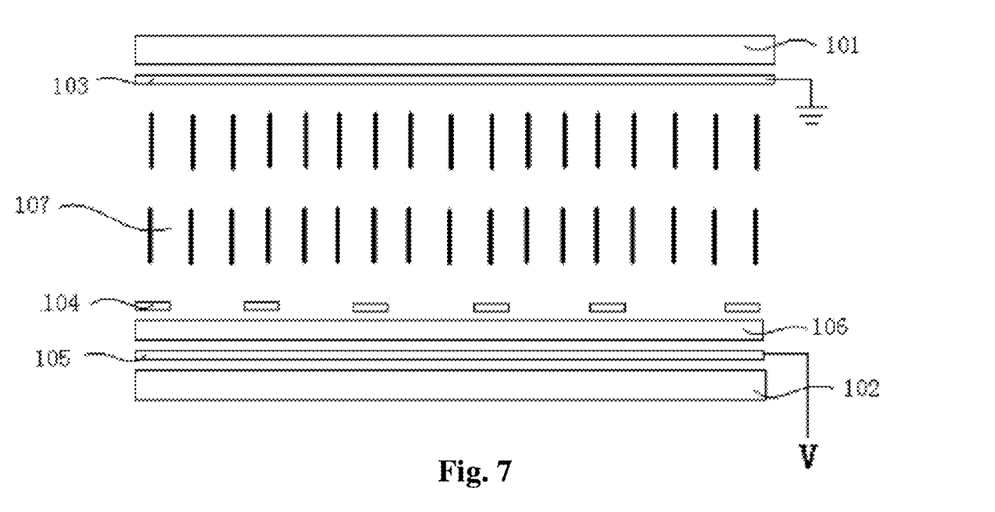
FIG. 7 is a diagram of the state of the electrode when the liquid crystal display device with controllable viewing angle according to the present invention is in 9 o'clock viewing angle direction.

FIG. 7 shows a diagram of the first viewing angle mode (9 o'clock viewing angle direction mode). As shown in FIG. 7, the liquid crystal display device with controllable viewing angle according to the present invention is operated in the 9 o'clock viewing angle direction mode (left viewing angle mode), thus a high contrast may be obtained only in the 9 o'clock direction, and a remarkable optical performance difference, such as serious gray scale inversion, is generated in other viewing angles, such that the image can not be seen clearly. To achieve the object, when the liquid crystal display device with controllable viewing angle according to the present invention is operating in the 9 o'clock viewing angle direction mode, a perpendicular electrical field is generated in the liquid crystal layer 107 by the pixel electrode 105 and the upper substrate common electrode 103, for example, by applying a driving voltage V to the pixel electrode 105, connecting the upper substrate common electrode 103 to the ground, and floating the lower substrate common electrode 104 to control the redirection of the liquid crystal such that the liquid molecules in the liquid crystal layer 107 deflect towards the pretilt direction 202. When there is no voltage applied, the liquid crystal molecules are arranged perpendicular, the polarization plates are attached to the upper substrate 101 and the lower glass substrate 102 orthogonally, which is in a dark state; when there is a voltage applied between the pixel electrode 105 and the upper substrate common electrode 103, the liquid molecules deflect towards the pretilt direction 202 (the liquid crystal molecules in the liquid crystal layer 107 have negative dielectric anisotropy), and parallel to the upper glass substrate 101 and the lower glass substrate 102, that is, deflect perpendicular to the strip direction on the lower substrate common electrode, and an angle between the falling direction and the absorption axis of the upper polarization plate is 40 degree, an angle between the falling direction and the absorption axis of the lower polarization plate is 130 degree, which is in a light state.

Figure 8:
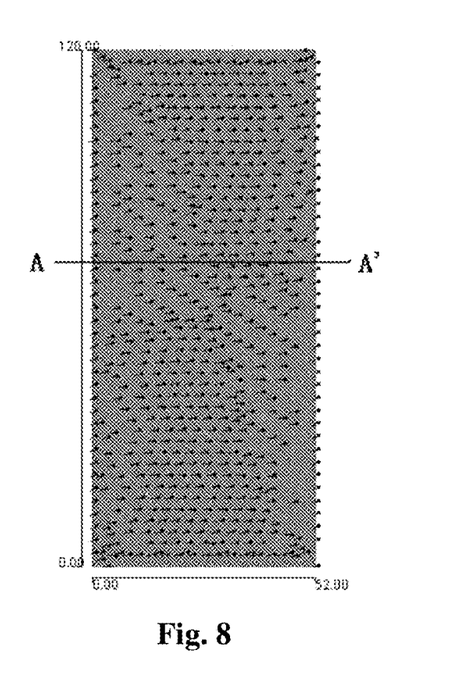
FIG. 8 is a top diagram of the arrangement of liquid crystal molecules in the case of the application of a voltage when the liquid crystal display device with controllable viewing angle according to the present invention is in 9 o'clock viewing angle direction.
Figure 9:
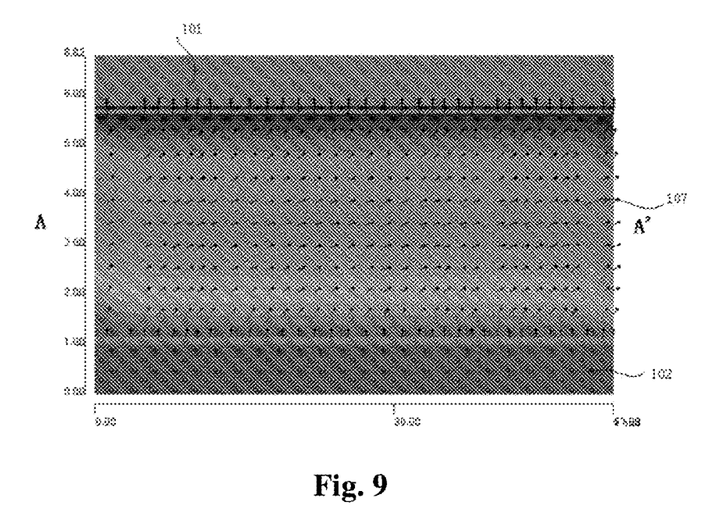
FIG. 9 is a sectional view of the top diagram of the arrangement of liquid crystal molecules in the case of the application of a voltage when the liquid crystal display device with controllable viewing angle according to the present invention is in 9 o'clock viewing angle direction.
Figure 10:
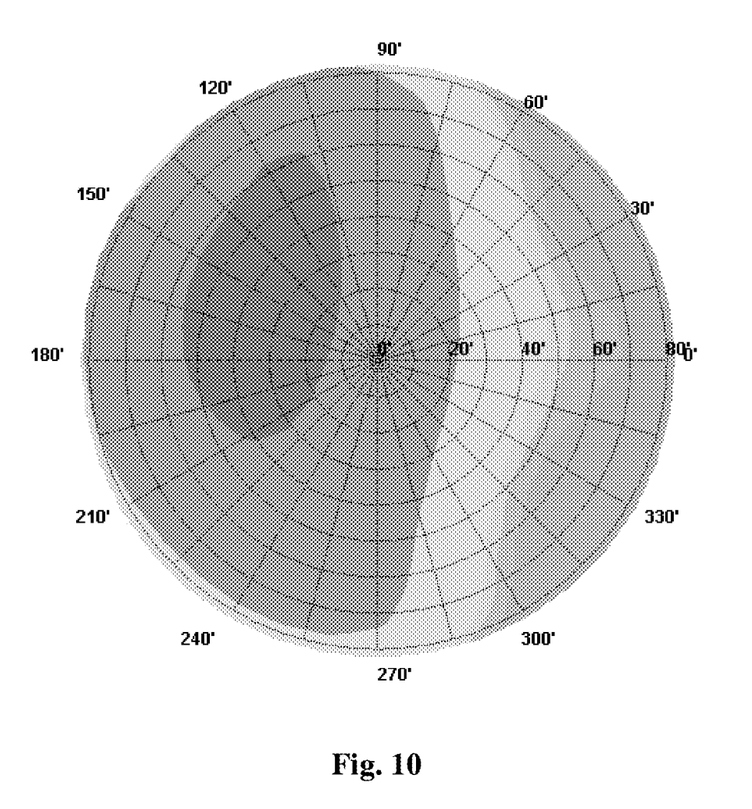
FIG. 10 is a viewing angle characteristic simulation diagram when the liquid crystal display device with controllable viewing angle according to the present invention is in 9 o'clock viewing angle direction.

Reference to FIGS. 8 and 9, FIG. 8 shows the arrangement direction distribution diagram of the liquid crystal molecules to which a voltage is applied in the 9 o'clock viewing angle direction mode and FIG. 9 shows a sectional diagram taken along line AA' in the FIG. 8. FIG. 10 shows a viewing angle characteristic simulation diagram in the 9 viewing angle direction mode.

Those skilled in the art will recognize that a dark region in the 6 o'clock direction in FIG. 6 is a viewing angle region with a contrast larger than 10; and a dark region in the 9 o'clock direction in FIG. 9 also is a viewing angle region with a contrast larger than 10.

According to the above embodiments, those ordinarily skilled in the art can make some general modifications. For example, the absorption axis direction 203 of the polarization plate of the upper substrate, the absorption axis direction 204 of the polarization plate of the lower substrate and the direction of the lower substrate common electrode 104 can be adjusted; or the absorption axis direction 203 of the polarization plate of the upper substrate, the absorption axis direction 204 of the polarization plate of the lower substrate and the tilting direction 202 of the liquid crystal molecules can be adjusted; or the tilting direction 202 of the liquid crystal molecules and the direction of the lower substrate common electrode 104 can be adjusted. In addition, combining with adjusting the pretilt angle of the liquid crystal molecules, the angle between the viewing direction of the first viewing angle mode and the viewing direction of the second viewing angle mode is adjusted to be larger than 0 degree and smaller than 180 degree by changing the tilting direction 202 of the liquid crystal molecules. The above modifications and alterations which fall within the scope of the invention. The direction of the first viewing angle mode and the direction of the second viewing angle mode which is obtained by the modifications and the experiment fall within the scope of the invention.

Those ordinarily skilled in the art should appreciate that various modifications and alterations can be made herein without departing from the spirit and scope of the invention. Therefore, it is to be understood that the invention includes all such modifications and alterations which fall within the scope of the appended claims and the substitutions.

What is claimed is:

1. A liquid crystal display device comprising:
   an upper substrate on which an upper substrate common electrode is disposed,
      a lower substrate parallel to the upper substrate on which a pixel electrode is disposed, and a liquid crystal layer sandwiched between the upper substrate and the lower substrate, the liquid crystal molecules are arranged perpendicular to the upper substrate in substance when no voltage is applied,
      wherein a plurality of strip-like lower substrate common electrodes are disposed on the lower substrate and arranged in parallel substantially, and
   wherein the upper substrate common electrode and the pixel electrode provide an electric field perpendicular to the upper substrate when a voltage is applied to the upper substrate common electrode and the pixel electrode to form a first viewing angle mode,
      and the lower substrate common electrode and the pixel electrode provide an electric field perpendicular to the upper substrate and an electric field parallel to the upper substrate when a voltage is applied to the lower substrate common electrode and the pixel electrode to form a second viewing angle mode,
      wherein the dielectric anisotropy of the liquid crystal molecules is negative,
      wherein there is an angle between a viewing direction of the first viewing angle mode and a viewing direction of the second viewing angle mode.

2. The liquid crystal display device according to claim 1, wherein an insulation layer is disposed between the lower substrate common electrode and the pixel electrode.

3. The liquid crystal display device according to claim 1, wherein the angle between the viewing direction of the first viewing angle mode and the viewing direction of the second viewing angle mode is larger than 0 degree and smaller than 180 degree.

4. The liquid crystal display device according to claim 3, wherein the viewing direction of the first viewing angle mode is substantially perpendicular to that of the second viewing angle mode.

5. The liquid crystal display device according to claim 1, wherein the first viewing angle mode is a left viewing angle mode, and the second viewing angle mode is a lower viewing angle mode.

6. The liquid crystal display device according to claim 1, wherein the upper substrate common electrode, the lower substrate common electrode and the pixel electrode are all transparent electrodes.

7. The liquid crystal display device according to claim 6, wherein the transparent electrode includes one of ITO, IZO and IGO or a combination thereof.

8. The liquid crystal display device according to claim 1, wherein polarization plates are attached to outside of the upper substrate and the lower substrate respectively, and the direction of absorption axis of the polarization plate attached to the upper substrate is vertical to the direction of absorption axis of the polarization plate attached to the lower substrate.

9. A driving method for a liquid crystal display device, the liquid crystal display device comprising:

an upper substrate on which an upper substrate common electrode is disposed, a lower substrate parallel to the upper substrate on which a pixel electrode is disposed, and a liquid crystal layer sandwiched between the upper substrate and the lower substrate, liquid crystal molecules are perpendicular to the upper substrate in substance when no voltage is applied, wherein a plurality of strip-like lower substrate common electrodes are disposed on the lower substrate and arranged in parallel substantially, the driving method comprising the following steps:

applying a voltage to the upper substrate common electrode and the pixel electrode to generate an electric field perpendicular to the upper substrate and thus provide a first viewing angle mode;

applying a voltage to the lower substrate common electrode and the pixel electrode to generate an electric field perpendicular to the upper substrate and an electric field parallel to the upper substrate and thus provide a second viewing angle mode; and switching between the first viewing angle mode and the second viewing angle mode by selectively applying the voltage to the upper substrate common electrode or the lower substrate common electrode, wherein there is an angle between a viewing direction of the first viewing angle mode and a viewing direction of the second viewing angle mode.

10. The driving method for a liquid crystal display device according to claim 9, wherein the angle between the viewing direction of the first viewing angle mode and the viewing direction of the second viewing angle mode is larger than 0 degree and smaller than 180 degree.

11. The driving method for a liquid crystal display device according to claim 10, wherein the direction of the first viewing angle mode is substantially perpendicular to that of the second viewing angle mode.

12. The driving method for a liquid crystal display device according to claim 9, wherein the lower substrate common electrode is floated when the voltage is applied to the upper substrate common electrode and the pixel electrode; and the upper substrate common electrode is floated when the voltage is applied to the lower substrate common electrode and the pixel electrode.

* * * * *